Aug. 25, 1925.
G. T. COOKE
1,550,784
SAFETY LOCK
Filed March 24, 1925
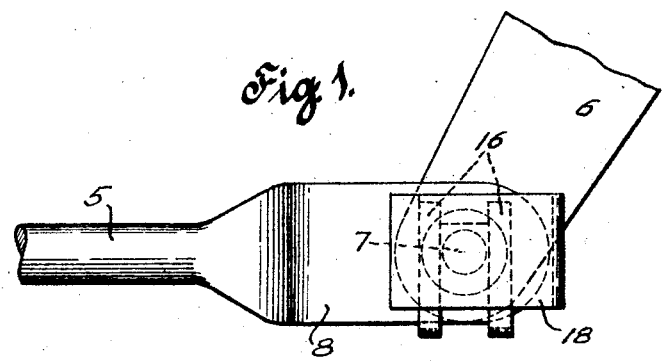
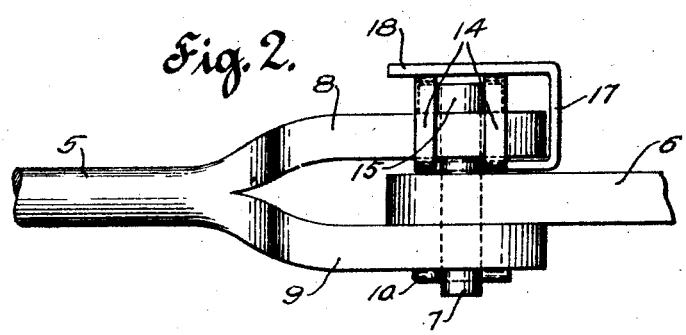
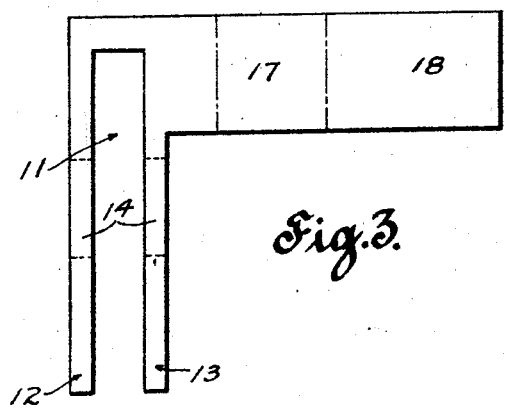
INVENTOR
George T. Cooke
BY
Mitchell Buhart
ATTORNEYS Patented Aug. 25, 1925.

1,550,784

UNITED STATES PATENT OFFICE.

GEORGE T. COOKE, OF NEW YORK, N. Y.

SAFETY LOCK.

Application filed March 24, 1925. Serial No. 17,890.

*To all whom it may concern:*

Be it known that I, GEORGE T. COOKE, a citizen of the United States of America, residing at New York, N. Y., have invented a new and useful Safety Lock, of which the following is a specification.

My invention relates to a safety lock for pins such as bolts or the like.

It is an object of the invention to provide a cheap safety lock for pins, bolts or the like which may be applied to existing structures without dismantling the same.

It is a further object to provide a safety lock for pins, bolts or the like in which there are a plurality of holding members for the pin.

Briefly stated, in the preferred form of the invention the pin lock comprises a sheet metal member which may be of substantially angle- or L-shape. One leg of the L may be apertured or slotted inwardly from one end so as to fit over a holding pin and the fingers defining the slot and the other leg of the plate may be bent over the head on the bolt.

In the drawings which show, for illustrative purposes only, a preferred form of the invention—

Fig. 1 is a side view of two parts held together by a pin and illustrating one form of the invention;

Fig. 2 is a view of the parts shown in Fig. 1 but viewed at right angles to Fig. 1;

Fig. 3 is a plan view of a blank illustrative of my invention.

The invention will be described in connection with a pin securing parts of a railway brake construction, in which 5 represents a rod or lever connected to a second lever or brake beam hanger 6. These parts are secured together by means of a bolt, pin or the like 7, extending through suitable apertures in the legs 8, 9 of the yoke on the rod or lever 5 and a corresponding aperture in the lever 6. It is usual to provide a cotter pin 10 for holding the pin in place, and it is the function of my invention to prevent accidental withdrawal of the bolt in case the cotter pin 10 should be omitted or should accidentally fall out.

In the form of the invention illustrated I employ a sheet metal plate which may be of substantially L-shape, as shown in Fig. 3. One leg of the L may be apertured to receive the pin 7, and in the specific illustration it is preferred to slot such leg inwardly from one end as shown at 11. This slot preferably extends from the end of the leg and slightly past the center line of the other leg of the plate.

Now, when the pin lock is to be applied, the two fingers 12, 13 bounding the slot 11 are passed in between the leg 8 of the yoke and the lever 6 and on opposite sides of the pin 7 so as to embrace the same. When the plate has been moved up substantially as far as it will go, the legs 12 and 13 are bent upwardly, as shown at 14—14 in Fig. 2, and the extreme ends then bent over the top of the head 15 on the pin 7. These extreme ends are indicated at 16. The other leg of the angle plate may then be bent over so as to cover the fingers 12—13 and also the head 15 of the pin.

It will be observed that this safety lock may be applied to existing constructions without dismantling the same, and that when the ends are bent over and above the pin head the latter will be safely locked against outward movement. Should the end 18 not be bent over or should it accidentally become straightened out, there would still be the fingers 12—13, or one of them, to hold the pin head in place. The invention, therefore, provides what may be termed a multiple safety device, in that there are three members extending over the pin head for holding the same in its proper position.

While the invention has been described in some detail and in connection with a specific application, I do not wish to be limited to the exact form shown nor to the specific application illustrated, since changes may be made within the scope of the invention as defined in the appended claims.

I claim:

1. A safety lock blank for pins comprising a plate of substantially L-shape, one leg of the L having therein an open slot extending from the free end to a point substantially to the center line of the other leg.

2. In a device of the character described and in combination with a pin and one member through which said pin may pass, a sheet metal lock including a plate having an open-ended slot therein to be passed about the pin at a point beneath the member through which it passes, the free ends of the plate bounding said slot being bent up over said member and over said pin head, and a portion of the plate extending at an angle to the slot portion being bent up over said member and said pin head.

GEORGE T. COOKE.